(12) United States Patent
Loof et al.

(10) Patent No.: US 9,850,942 B2
(45) Date of Patent: Dec. 26, 2017

(54) BEARING AND BEARING ARRANGEMENT

(71) Applicants: Marcus Loof, Nol (SE); Peter James, Mölndal (SE); Lars Stigsjöö, Angered (SE)

(72) Inventors: Marcus Loof, Nol (SE); Peter James, Mölndal (SE); Lars Stigsjöö, Angered (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/090,240

(22) Filed: Apr. 4, 2016

(65) Prior Publication Data
US 2016/0298686 A1  Oct. 13, 2016

(30) Foreign Application Priority Data

Apr. 9, 2015  (SE) ...................................... 1550421

(51) Int. Cl.
*F16C 33/48* (2006.01)
*F16C 19/38* (2006.01)
*F16C 33/58* (2006.01)
*F16C 23/08* (2006.01)
(Continued)

(52) U.S. Cl.
CPC ............ *F16C 23/086* (2013.01); *F16C 33/48* (2013.01); *F16C 33/485* (2013.01); *F16C 33/495* (2013.01); *F16C 33/583* (2013.01); *F16C 19/38* (2013.01); *F16C 33/467* (2013.01); *F16C 33/4641* (2013.01)

(58) Field of Classification Search
CPC ........ F16C 19/38; F16C 23/086; F16C 25/08; F16C 33/48; F16C 33/49; F16C 33/4641; F16C 33/467; F16C 33/583; F16C 33/585
USPC ....... 384/495, 515, 548, 560, 564–565, 568, 384/572, 577
See application file for complete search history.

(56) References Cited

U.S. PATENT DOCUMENTS 2,430,397 A * 11/1947 Hendricks ............. F16C 23/086
384/577
2,611,670 A * 9/1952 Gunnar ................. F16C 23/086
29/898.07
(Continued)

FOREIGN PATENT DOCUMENTS

EP        1816362 A1   8/2007
EP        2787224 A2  10/2014
(Continued)

*Primary Examiner* — Marcus Charles
(74) *Attorney, Agent, or Firm* — Bryan Peckjian; SKF USA Inc. Patent Dept.

(57) ABSTRACT

A spherical roller bearing including an outer ring providing at least one inner raceway, an inner ring providing a first and a second outer raceway, a plurality of roller elements arranged in a first and second roller row between the at least one inner raceway and the first and second outer raceway, a cage for at least one of guiding and retaining the roller elements in the first and second roller row. The cage provides a plurality of cage pockets, wherein one of the roller elements is disposed within each one of the plurality of cage pocket. The bearing further provides a specific pitch circle diameter (PCD), and the cage is over-pitched roller centered in relation to the pitch circle diameter (PCD). In addition, a bearing arrangement is disclosed.

11 Claims, 3 Drawing Sheets

(51) Int. Cl.
*F16C 33/49* (2006.01)
*F16C 33/46* (2006.01)

(56) References Cited

U.S. PATENT DOCUMENTS

| | | | | |
|---|---|---|---|---|
| 4,472,006 A | * | 9/1984 | Goransson | F16C 23/086 384/576 |
| 4,671,682 A | * | 6/1987 | Yoshihara | F16C 19/26 384/480 |
| 4,714,358 A | * | 12/1987 | Bayer | F16C 19/385 384/470 |
| 4,916,750 A | * | 4/1990 | Scott | F16C 23/086 384/484 |
| 5,860,747 A | * | 1/1999 | Wan | F16C 33/445 384/463 |
| 6,814,494 B2 | * | 11/2004 | Borowski | F16C 23/086 384/484 |
| 8,007,184 B2 | * | 8/2011 | Murai | F16C 19/38 384/450 |
| 2007/0127858 A1 | * | 6/2007 | Nakagawa | F16C 19/505 384/495 |
| 2007/0292065 A1 | * | 12/2007 | Falk | F16C 23/086 384/477 |
| 2012/0121420 A1 | * | 5/2012 | Yuki | C21D 1/10 416/174 |
| 2014/0050431 A1 | * | 2/2014 | Brameshuber | D21F 7/02 384/495 |

FOREIGN PATENT DOCUMENTS

| | | | | |
|---|---|---|---|---|
| JP | 2007024112 A | * | 2/2007 | F16C 33/58 |
| JP | 2010190241 A | * | 9/2010 | F16C 33/7806 |
| JP | 2012017770 A | * | 1/2012 | F16C 23/086 |

* cited by examiner

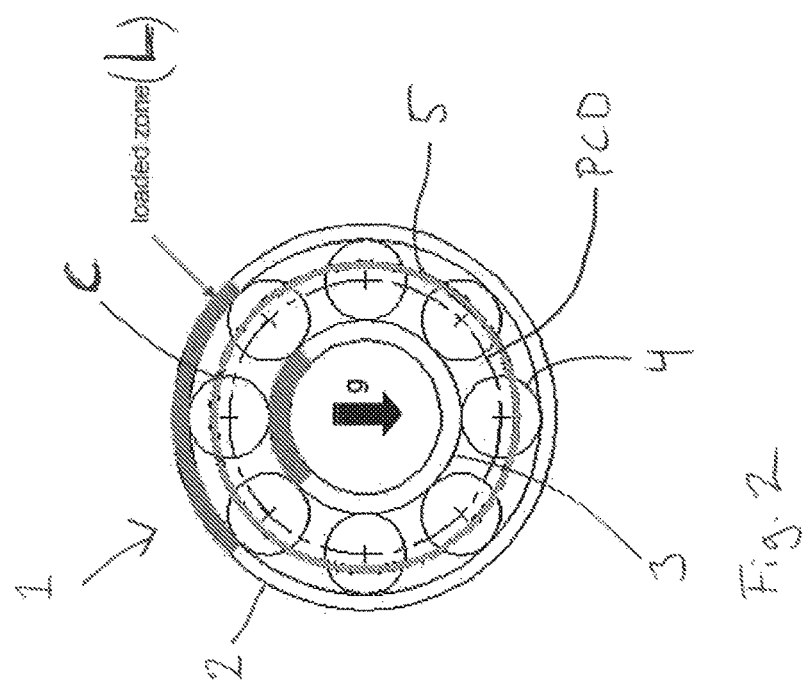
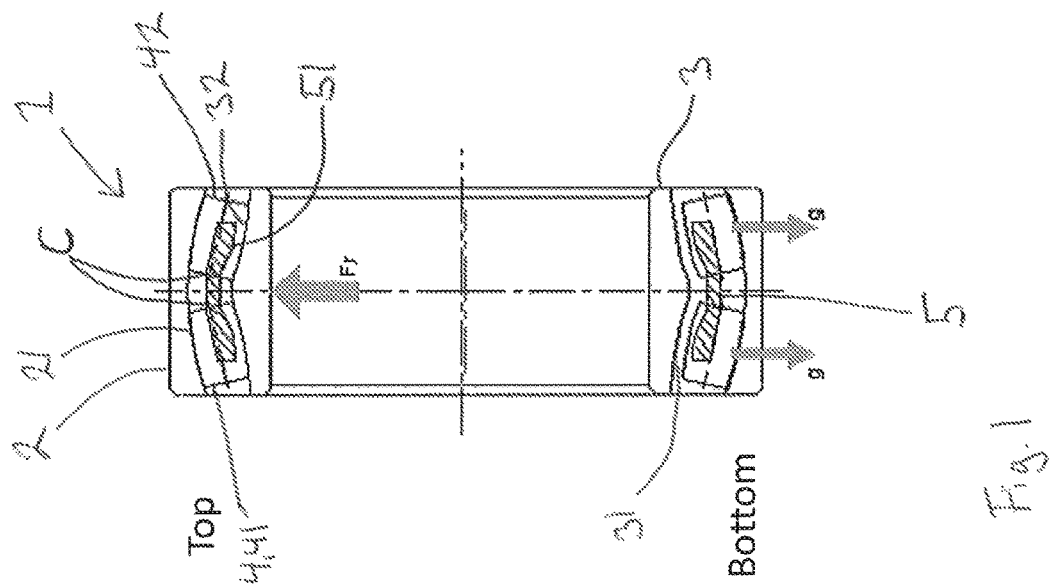

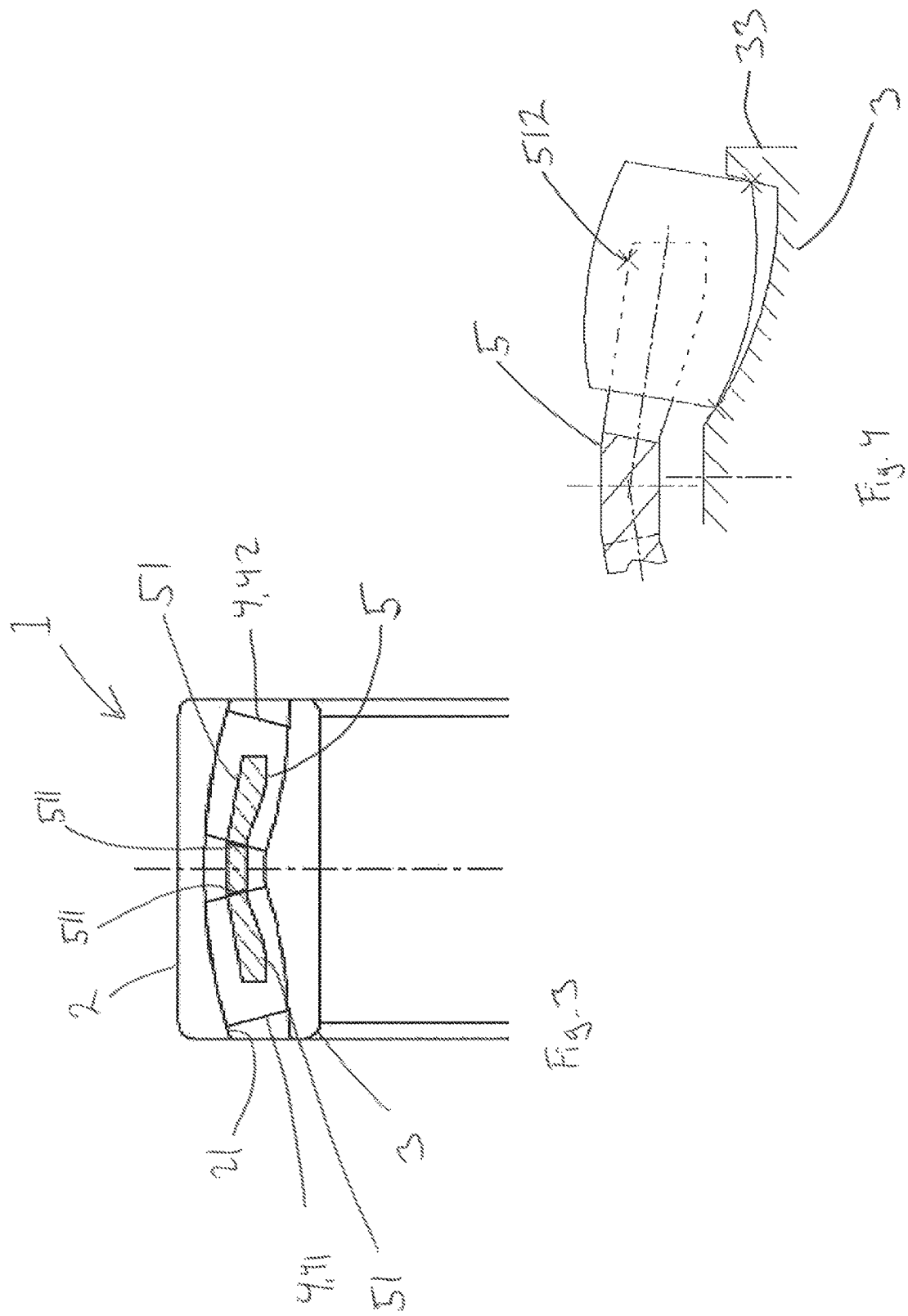

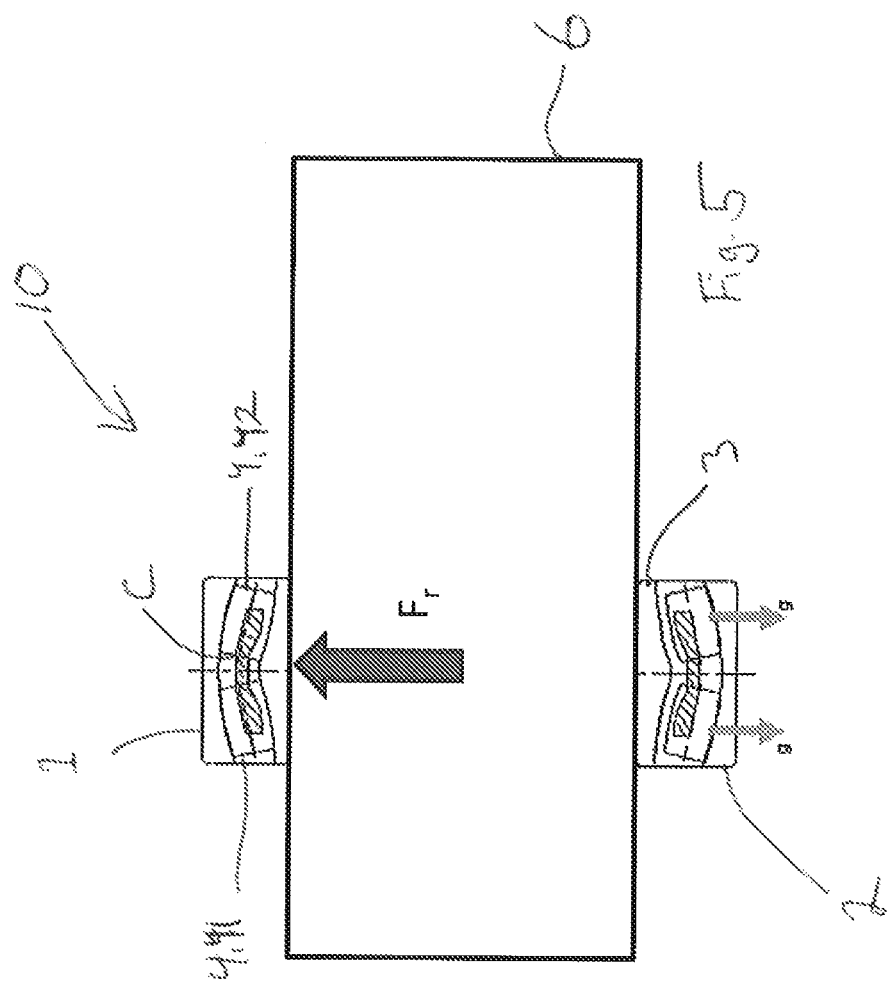

BEARING AND BEARING ARRANGEMENT

CROSS-REFERENCE TO RELATED APPLICATIONS

This application claims priority to Swedish patent application no. 1550421-0 filed on Apr. 9, 2015, the contents of which are fully incorporated herein by reference.

TECHNICAL FIELD

According to a first aspect, the invention regards a spherical roller bearing. According to a second aspect, the invention regards a bearing arrangement.

BACKGROUND OF THE INVENTION

Spherical roller bearings are well known for its ability to accommodate radial and axial loads, but also for its misalignment ability. These bearings are used in many different applications, especially in more demanding applications where there are larger loads and also where there may be shaft deflections. One example of where a spherical roller bearing can be advantageously used is in wind turbine applications. Other examples of areas where these bearings can be a suitable alternative is in pulp and paper machines, marine applications, off-highway applications and in mining applications.

There are several different designs available. For instance, there are spherical roller bearings comprising comb-shaped cages, but also bearings comprising window type cages. In addition, some of the known designs include guide rings and other bearing types include mid-flanges on the inner rings. The different designs present different advantages and are thus useful and adapted to different needs. The bearings may for instance be optimized for different circumstances and environments, such as for high or low speed applications, mainly for radial loads, mainly for axial loads, large shaft deflections etc.

SUMMARY OF THE INVENTION

In view of the above, an object of the present invention is to provide a new spherical roller bearing design and bearing arrangement which alleviates at least some of the drawbacks of the prior art. Moreover, an object of the present invention is to provide a spherical roller bearing design which is especially advantageous for use in applications where a loaded zone of the bearing is located in a radial top region of the bearing in relation to the force of gravity and for essentially horizontal bearing arrangements.

The objects have been achieved by the features as presented in the independent claims. Advantageous embodiments of the invention can be found in the dependent claims and in the accompanying description and drawings.

According to the first aspect thereof, the objects have been achieved by a spherical roller bearing, comprising, an outer ring presenting at least one inner raceway, an inner ring presenting a first and a second outer raceway, a plurality of roller elements arranged in a first and second roller row in-between the at least one inner raceway and the respective first and second outer raceway. Moreover, the bearing comprises a cage for guiding and/or retaining the roller elements in the first and second roller row, the cage presents a plurality of cage pockets, in which each cage pocket one of the roller elements is meant to be located. The bearing further presents a specific pitch circle diameter, and the cage is over-pitch roller centered in relation to the pitch circle diameter. With over-pitched is meant that the contact between the roller elements and the cage will be at a location which is radially outwardly from the pitch circle diameter. In addition, with roller centered is meant that the cage will be centered by the roller elements and not by for instance the inner ring or a guide ring which is common practice for known bearing designs.

A bearing's pitch circle diameter is something which is well known by the skilled person. The pitch circle diameter can be defined as the diameter that intersects the rotational axle of the roller elements in the bearing in an axial location of the bearing. In addition, the phrases axial and radial are frequently used in this document. If nothing else is stated, an axial direction is defined as the axial direction of the bearing which is parallel to its rotational axis, the axial direction of the inner ring which is parallel to its rotational axis, the axial direction of the outer ring which is parallel to its rotational axis and the axial direction of the cage which is parallel to its rotational axis. Radial direction is the direction which is perpendicular to the corresponding axial directions.

With this configuration of the bearing and its cage, the inventors have realized that this will be advantageous and useful for applications where a loaded zone of the bearing is located in a radial top region of the bearing in relation to the force of gravity during operation of the bearing. With an over-pitch roller centering, the cage and roller elements will contact each other in a radial top region of the bearing in relation to the force of gravity. This will in turn lead to, in the case when there is a radial load acting in the essentially opposite direction to the force of gravity, that the centering of the cage by the rollers will occur in the loaded zone of the bearing. The rollers in the loaded zone are in a firm position between the bearing rings and will not fluctuate or skew, which will lead to that the cage will behave in a stable manner in the bearing.

In an embodiment of the present invention, each cage pocket further presents a cage pocket bottom which faces an axially inner axial end face of the roller element in the respective cage pocket, and wherein the cage pocket bottom is arranged to be able to contact the roller element radially outwardly from the pitch circle diameter. Thus, the roller centering function for the cage can occur between the cage pocket bottom surface and the end face of the roller element which is located in the respective cage pocket.

In an embodiment of the present invention, the cage pocket bottom is further arranged to be able to contact the roller element, during operation of the bearing, in a top region of the bearing which is located essentially opposite to the direction of the force of gravity. Again, it is advantageous to let the contact occur in the loaded zone of the bearing, which will be in the radial top region of the bearing when there is a radial load acting on the bearing's radial top region.

In an embodiment of the present invention, two essentially axially opposite cage pockets bottoms for the first and second respective roller rows are relatively inclined and essentially following the contact angles of the respective first and second roller rows. With this design, the two axially opposite cage pocket bottoms will assume a wedge-like shape between its roller elements in the respective first and second roller rows. This will lead to a firm and stable contact between the rollers and the cage.

In an embodiment of the present invention, the bearing does not present any spacer ring (such as a guide ring) or mid-flange axially in-between the first and second roller rows. It is well known to make use of a guide ring axially in-between the two roller rows of the bearing. The guide ring is especially useful when the bearing is used in more high-speed applications. In addition, the cage is often centered on the guide ring, which in turn is in contact with the inner ring. By removing the guide ring from the bearing, there will be fewer components. This is of course advantageous in terms of cost, but also it may lead to a more robust bearing design due to the fact that there will be fewer components in the bearing. Moreover, a mid-flange, which is frequently used in prior art designs, is also costly to have since the manufacturing of an inner ring comprising a mid-flange will be more complicated. Also, the presence of a mid-flange will result in more material, leading to a higher weight and also a higher material cost. In addition, the design of the present invention will lead to that there will be a free space between the cage and the inner ring in-between the first and second roller row. This space can be used for lubricant, such as grease or oil. This may lead to that the lubrication of the contact between the raceways of the inner ring and the roller elements is improved since the lubricant can be stored in the proximity of these contact zones.

In another embodiment, a spacer ring or guide ring for guiding the roller elements is present axially in-between the first and the second roller row. A spacer ring may be needed in applications where there are higher rotating speeds. For instance, the spacer ring may guide the roller elements in the first and second roller row.

In an embodiment of the present invention, a spherical roller bearing is presented, wherein at least one of the plurality of cage pockets is radially outwardly enclosing the roller contained therein such that the roller element will be restricted to move radially outwardly out from the at least one cage pocket. By having such a design the roller elements can be prevented from falling out from the bearing, for instance during assembly of the bearing. In another embodiment, the inner ring further presents a first and second axially outer region on opposite axial sides of the bearing, wherein the respective first and second axially outer region presents a first and second respective side flange. The side flange can further improve and prevent rollers from falling out from the bearing.

In an embodiment of the present invention, the cage is a comb-shaped cage (also known as a pronge type cage). In an embodiment, the cage is made of a polymer, a metal such as brass, steel or iron, or any other suitable material recognized by the skilled person.

According to the second aspect of the invention, the objects are achieved by a bearing arrangement for applications where there is a radial load acting in the essentially opposite direction to the force of gravity, wherein the bearing arrangement comprises a bearing (1) according to the first aspect of the invention. It shall be noted that any embodiment of the first aspect of the invention is applicable to any embodiment of the second aspect of the invention and vice versa. It has been realized by the inventors that the bearing design according to the first aspect of the invention is especially advantageous for applications where a loaded zone of the bearing is located in a radial top region of the bearing in relation to the force of gravity, which has already been elaborated upon hereinabove.

Other embodiments and modifications to the current embodiments presented herein within the scope of the claims would be apparent to the skilled person. For example, the skilled person will understand and realize that the cage pocket geometry can be designed differently to still achieve the same effect, i.e. that the cage will be over-pitched roller centered.

BRIEF DESCRIPTION OF THE DRAWINGS

Exemplifying embodiments of the present invention will now be described in more detail, with reference to the accompanying drawings, wherein:

FIG. 1 shows a cross sectional view of a bearing according to an embodiment of the invention.

FIG. 2 shows a bearing according to an embodiment of the present invention.

FIG. 3 shows another cross sectional view of a bearing according to an embodiment of the present invention.

FIG. 4 shows an enlarged cross sectional view of an inner ring of a bearing according to an embodiment of the present invention.

FIG. 5 shows a cross sectional view of a bearing arrangement according to the second aspect of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION OF THE INVENTION

FIG. 1 shows a spherical roller bearing 1 (in cross sectional view) according to an embodiment of the invention. The bearing 1 comprises an outer ring 2 with one inner spherical raceway 21, an inner ring 3 presenting a first and a second outer raceway 31 and 32, a plurality of roller elements 4 arranged in a first and second roller row, 41 and 42, in-between the at least one inner raceway 21 and the respective first and second outer raceways 31 and 32. Moreover, the bearing 1 comprises a cage 5 for guiding and/or retaining the roller elements 4 in the first and second roller row 41 and 42, the cage 5 presents a plurality of cage pockets 51, in which each cage pocket 51 one of the roller elements 4 is meant to be located. The bearing 1 further presents a specific pitch circle diameter (PCD), and the cage 5 is over-pitch roller centered in relation to the pitch circle diameter (PCD). With over-pitch is meant that the contact between the roller elements 4 and the cage 5 will be at a location which is radially outwardly from the pitch circle diameter (PCD). In addition, with roller centered is meant that the cage 5 will be centered by the roller elements 4 and not by for instance the inner ring or a guide ring which is common practice for known bearing designs. Further, in this figure, it can be seen that the bearing is affected by a gravity force g and by a radial force $F_r$ acting in the essentially opposite direction to the gravity force g. The roller centering of the cage 5 is occurring at the contact points C in the radial top region of the bearing, which also is located radially above the pitch circle diameter (PCD). As further can be seen in this figure, the bearing presents a specific bearing clearance, which can be seen in the bottom region of the bearing 1 in that the roller elements 4 are not or almost not in contact (exaggerated in this view) with the inner ring 3. Due to the spherical shape of the raceway 21 the roller elements 4 will in the bottom region strive to move axially inwardly towards each other.

In FIG. 2 it can more clearly be seen that the contact C between the cage 5 and the roller elements 4 will occur radially outside the pitch circle diameter (PCD). In this figure and embodiment, the outer ring 2, inner ring 3 is also seen. In addition, a loaded zone L acting in the top region of the bearing 1 is shown. The loaded zone L is located on an opposite side to the gravity force g.

FIG. 3 shows another cross sectional view of a bearing 1 according to an embodiment of the present invention. The bearing 1 comprises an outer ring 2 with one inner spherical raceway 21, an inner ring 3 presenting a first and a second outer raceway 31 and 32, a plurality of roller elements 4 arranged in a first and second roller row, 41 and 42, in-between the at least one inner raceway 21 and the respective first and second outer raceways 31 and 32. Moreover, the bearing 1 comprises a cage 5 for guiding and/or retaining the roller elements 4 in the first and second roller row 41 and 42, the cage 5 presents a plurality of cage pockets 51, in which each cage pocket 51 one of the roller elements 4 is meant to be located. The bearing 1 further presents a specific pitch circle diameter (PCD), and the cage 5 is over-pitched roller centered in relation to the pitch circle diameter (PCD). Further, in this embodiment, it can be seen that the cage pockets 51 present cage bottoms 511 which are located on an axial inner side of the cage pockets 51 and which are facing the axially inner axial side faces of the roller elements 4 in the respective first and second roller rows 41 and 42. The cage 5 will contact the axial side faces of the roller elements 4 at the cage pocket bottoms 511. In addition, the cage pocket bottoms 511 are inclined and essentially in line with the contact angles of the first and second roller rows 41 and 42. Due to this, the two oppositely located cage pocket bottoms 511 will be shaped as a wedge. This will lead to that the cage 5 will "fall down" on the axial side faces of the roller elements 4 due to the gravity force g.

FIG. 4 shows a portion of a cross sectional view of a bearing 1 according to an embodiment of the present invention. In this view, a portion of an inner ring 3 can be seen, a cage 5, a roller 4 and a side flange 33 of the inner ring 3. Further, here it can be seen that the cage pocket 51 is outwardly enclosing the roller such that the roller 4 will not be able to move radially outwardly out from the cage pocket 51. This has been done by having a curved profile in the cage pocket 51 such that the roller 4 will eventually contact a contact portion 512 of the cage pocket 51. In addition, the side flange 33 will prevent the roller 4 from axially falling out from the bearing 1. This will lead to that the rollers 4 will be self-contained in the bearing 1. Thus, there is no need for having for example a window-type cage. The rollers 4 will still not be able to fall out from the bearing at any time. This is advantageous, especially for safety reasons.

FIG. 5 shows a cross sectional view of a bearing arrangement 10 according to an embodiment of the second aspect of the present invention. The arrangement 10 comprises a bearing 1 according to the first aspect of the invention and a shaft 6. Further, it can be seen in this example that a force $F_r$ is acting on the bearing. The force $F_r$ is acting on the top region of the bearing 1 in the opposite direction to the gravity force g. The bearing 1 present an outer ring 2 and an inner ring 3, and a first and second roller row 41 and 42 with roller elements 4. It can be seen in the figure that there is a contact C between the cage 5 and the roller elements 4 in the top region of the bearing where the force $F_r$ is acting. Further, the contact is occurring radially above the pitch circle diameter.

The invention claimed is:

1. A spherical roller bearing, comprising,
   an outer ring providing at least one inner raceway,
   an inner ring providing a first and a second outer raceway,
   a plurality of roller elements arranged in a first and second roller row disposed between the at least one inner raceway and the first and second outer raceway,
   a cage for at least one of guiding and retaining the roller elements in the first and second roller row, the cage providing a plurality of cage pockets, one of the roller elements disposed in each one of the plurality of cage pockets, and
   the bearing providing a specific pitch circle diameter, wherein
   the cage is configured to be over-pitch roller centered in relation to the pitch circle diameter such that contact between the cage and each of the plurality of roller elements is at a location which is radially outwardly from the pitch circle diameter and such that the cage is not centered by the inner ring and is not centered by the outer ring.

2. The spherical roller bearing according to claim 1, wherein the cage is further arranged, during operation of the bearing, to contact the roller elements in a top region of the bearing located opposite to the direction of the force of gravity.

3. The spherical roller bearing according to claim 1, wherein each cage pocket further includes a cage pocket bottom that faces an axially inner axial end face of the roller element in the respective cage pocket, and wherein the cage pocket bottom is configured to contact the roller element radially outwardly from the pitch circle diameter (PCD).

4. The spherical roller bearing according to claim 3, wherein the cage pocket bottom is configured to contact the roller element, during operation of the bearing, in a top region of the bearing which is located essentially opposite to the direction of the force of gravity.

5. The spherical roller bearing according to claim 3, wherein two axially opposite cage pockets bottoms for the first and second respective roller rows are inclined and follow the contact angles of the respective first and second roller rows.

6. The spherical roller bearing according to claim 1, wherein no spacer ring is disposed axially between the first and second roller rows.

7. The spherical roller bearing according to claim 1, wherein at least one of the plurality of cage pockets is radially outwardly enclosing the roller element contained therein such that the roller element will be restricted to move radially outwardly out from the at least one cage pocket.

8. The spherical roller bearing according to claim 1, wherein the inner ring provides a first and second axially outer region on opposite axial sides of the bearing, and wherein the respective first and second axially outer region presents a first and second respective side flange.

9. The spherical roller bearing according to claim 1, wherein the cage is a comb-shaped cage.

10. The spherical roller bearing according to claim 1, wherein no mid-flange is disposed axially between the first and second roller rows.

11. A bearing arrangement for applications where there is a radial load acting in an opposite direction to the force of gravity, the bearing arrangement comprising a bearing, the bearing having;
   an outer ring providing at least one inner raceway,
   an inner ring providing a first and a second outer raceway,
   a plurality of roller elements arranged in a first and second roller row disposed between the at least one inner raceway and the first and second outer raceway,
   a cage for at least one of guiding and retaining the roller elements in the first and second roller row, the cage providing a plurality of cage pockets, one of the roller elements disposed in each one of the plurality of cage pockets, and the bearing providing a specific pitch circle diameter,
wherein
the cage is configured to be over-pitch roller centered in relation to the pitch circle diameter such that contact between the cage and each of the plurality of roller elements is at a location which is radially outwardly from the pitch circle diameter and such that the cage is not centered by the inner ring and is not centered by the outer ring.

* * * * *